3,174,908
PREPARATION OF L-GLUTAMIC ACID BY FERMENTATION
Toshinori Matsui and Yukio Nishimura, Yatsushiro-shi, Kumamoto-ken, Ichijiro Ide, Yokohama-shi, Kanagawa-ken, Hiroshi Okada, Chiyoda-ku, Tokyo, Iwao Kameyama, Daito-ku, Tokyo, and Toshinao Tsunoda, Zushi-shi, Kanagawa-ken, Japan, assignors to Ajinomoto Co., Inc., and Sanruku Distillers Co., Inc., Tokyo, Japan
No Drawing. Filed June 6, 1962, Ser. No. 200,323
Claims priority, application Japan, June 9, 1961, 36/20,053
8 Claims. (Cl. 195—47)

This invention relates to the preparation of L-glutamic acid by fermentation, and more particularly to improvements in the large-scale bacterial fermentation of carbohydrates to form L-glutamic acid in a culture medium.

It is known that certain microorganisms can metabolize carbohydrates to produce L-glutamic acid. Among the numerous species of bacteria capable of such action are certain species from the genera Bacillus, Micrococcus, Brevibacterium, Corynebacterium, and Microbacterium. The known aqueous culture media employed contain a source of carbon, a nitrogen source, certain inorganic salts and additional nutrients.

Suitable known carbon sources include substantially pure sugars, such as glucose, fructose, maltose and sucrose, but also such mixtures as starch hydrolyzates which may be obtained by the effects of acids, of enzymes or otherwise. Ammonia gas, aqueous solutions of ammonium hydroxide, the salts of ammonium hydroxide with sulfuric, hydrochloric or nitric acid, and urea are typical nitrogen sources.

Inorganic salts known to be necessary or beneficial to the growth of the bacteria employed include potassium dihydrogen phosphate and the sulfates of magnesium, bivalent iron and manganese. Suitable additional nutrients include corn steep liquor, protein hydrolyzates, purified amino acids, biotin, desthiobiotin, diaminopelargonic acid and oleic acid.

It is conventional to maintain the temperature of the culture media at temperatures between 27 and 32° C.

The fermentation process for the production of L-glutamic acid from sugars is in successful use on an industrial scale. We have found that the known process can be improved to increase the yield of glutamic acid, to shorten the time required for fermentation and to increase the concentration of glutamic acid in the fermentation broth when the broth is ready for recovery of glutamic acid therefrom.

The improvement of the known process is brought about by controlled changes in the concentration of the carbon source during fermentation, by controlling the temperature of the fermentation medium during a selected portion of the fermentation process at values different from those heretofore employed, and preferably by a combination of both measures.

The fermentation of a culture medium inoculated with bacteria capable of fermenting the medium to produce glutamic acid has two distinct stages. In the first or multiplication stage, the number of bacteria increases while the increase in glutamic acid concentration is small. In the second or productive stage, the increase in the number of bacteria is relatively insignificant and there is a relatively rapid increase in the concentration of L-glutamic acid to a maximum value.

We have found that the rate of glutamic acid production during the second stage can be accelerated by feeding relatively concentrated solutions of a supplemental carbon source, such as sugar, to the culture during this stage, and that this improved production rate can be further enhanched by careful selection of the temperature.

The following Examples I to IV show the results of laboratory tests.

EXAMPLE I

An aqueous culture medium containing

| | |
|---|---|
| $KH_2PO_4$ | 0.1 gram per 100 ml. |
| $MgSO_4 \cdot 7H_2O$ | 0.04 gram per 100 ml. |
| $Fe^{++}$ | 2 parts per million. |
| $Mn^{++}$ | 2 parts per million. |
| Corn steep liquor | 0.5 gram per 100 ml. |
| Vitamin $B_1$ | 80 micrograms per liter. |
| Original sugar concentration | 15 grams per 100 ml. |
| Sugar concentration after supplemental feeding (sugar means glucose in this example) | 19 grams per 100 ml. | was inoculated with Brevibacterium lactofermentum No. 2256 (ATCC No. 13,869) and cultured for 48 hours at 30° C. under aerobic conditions with shaking. The sugar concentration was checked intermittently. When the sugar concentration had dropped by about 3 percent of the original value, a portion of the culture medium was withdrawn, and the total added to the portion was raised to 19 grams per 100 ml. by the addition of an almost saturated sugar solution. The procedure was repeated with an additional portion of the original culture when the sugar concentration had dropped by about 6 percent, and the total sugar added to the remainder was raised to 19 grams per 100 ml. when its original sugar concentration had dropped by about 9 percent.

48 hours after the inoculation, the three culture portions were analyzed with the results given in Table I.

*Table I*

| Reduction of sugar concentration from initial value at time of supplemental feed, percent | L-glutamic acid produced, Grams per 100 ml. | Percentage Yield on basis of total sugar |
|---|---|---|
| 3 | 5.50 | 29.0 |
| 6 | 7.03 | 37.0 |
| 9 | 6.10 | 32.1 |

When this test was repeated with other microorganisms and with culture media modified within the conventional limits, it was found that there is a peak in glutamic acid production when supplemental sugar is fed to the culture after approximately 5 to 8 percent of the original sugar present has been consumed.

EXAMPLE II

Four cultures were prepared in the manner outlined in Example I. In all cases, concentrated sugar (sugar means glucose in this example) solution was added after the initial sugar concentration had dropped by about 6 percent. The four cultures differed in the temperature at which they were being kept after the supplemental feeding until the glutamic acid acid concentration reached a maximum value. The relationship between the culture temperature, the time required for maximum glutamic acid production, and the amounts of glutamic acid formed is evident from Table II.

Table II

| Temperature, Degrees C. | L-glutamic acid produced, g./100 ml. | Yield based on total sugar, percent | Period of Incubation, Hours |
|---|---|---|---|
| 30 | 7.45 | 36.5 | 50 |
| 34 | 8.01 | 39.3 | 44 |
| 36 | 8.87 | 43.5 | 40 |
| 39 | 6.57 | 32.2 | 44 |

Production of glutamic acid reaches a maximum, and the necessary incubation period is at a minimum when the culture is held at temperatures between 34 and 38° C.

EXAMPLE III

To determine the combined effects of total sugar (sugar means glucose) supplied, the timing of a supplemental sugar feeding, and the temperature of the culture medium during the production stage, additional comparison tests were run under the conditions of Example I except as specifically stated. One culture initially contained 14.70 grams sugar per 100 ml. The total amount of sugar added was raised to about 19 grams per 100 ml. after 6 percent of the initial sugar was consumed, the incubation was then continued to a maximum glutamic acid level at 36° C. Three other cultures did not receive a supplemental feeding at the end of the multiplication stage. All cultures were kept at 31.5° until their initial sugar content had dropped by 6 percent. Other test conditions and the effects achieved are evident from Table III.

Table III

| Supplemental fed sugar | Temperature in production stage, ° C. | Total sugar, g./100 ml. | Glutamic acid produced, g./100 ml. | Yield, percent | Incubation period, hrs. |
|---|---|---|---|---|---|
| No | 31.5 | 14.70 | 5.89 | 40.0 | 40 |
| No | 36 | 14.70 | 6.21 | 42.2 | 36 |
| No | 36 | 20.16 | 7.52 | 37.3 | 42 |
| Yes | 36 | 20.16 | 8.55 | 42.4 | 36 |

It is evident that a very high concentration of glutamic acid requires both the feeding of supplemental sugar at a later stage of fermentation and the maintenance of a higher temperature during this stage than is conventionally employed.

EXAMPLE IV

To determine the optimum amount of sugar supplied, three cultures were grown on the medium and under the conditions of Example I. After the initial sugar (sugar means glucose in this example) concentration had dropped by about 6 percent, varying amounts of supplemental sugar (sugar means glucose) were added to the medium. The results in terms of yield and incubation time are listed below.

Table IV

| Supplemental sugar fed, percent of original sugar | Total sugar supplied, g/100 ml. | Glutamic acid produced, g/100 ml. | Yield, percent of total sugar | Incubation period, hours |
|---|---|---|---|---|
| 25 | 20.79 | 8.40 | 41.5 | 36 |
| 40 | 26.28 | 6.78 | 25.8 | 50 |
| 100 | 32.03 | 5.35 | 16.7 | 50 |

These and other test runs indicate that the total amount of sugar fed to the culture medium should preferably be not higher than 21 to 23 grams per 100 milliliters of culture medium, and this amount includes the supplemental feeding after the multiplication stage. At sugar concentrations of 30 grams per 100 ml. and more, sugar metabolism of the culture is sharply reduced.

While the results tabulated in Tables I to IV are based on the use of *Brevibacterium lactofermentum* No. 2256, substantially identical results are obtained when the microorganism which metabolizes a carbon source and a nitrogen source to form glutamic acid is a species of the genus Bacillus, such as *Bacillus megaterium*, *Bacillus subtilis*, *Bacillus circularis*, *Bacillus cereus*, *Escherichia coli* and related species. Several species of the genus Micrococcus such as *Micrococcus varians* respond to the afore-described variations in culture conditions in the same manner as the *Brevibacterium lactofermentus* strain more specifically illustrated. Other species and strains of the genus Brevibacterium which also produce L-glutamic acid and behave in an analogous manner include the strains of *Brevibacterium lactofermentum* identified by their American Type Culture Collection (ATCC), Nos. 13,655 and 13,689, *Brevibacterium kawasakii*, *Brevibacterium divaricatum*, *Brevibacterium ammoniagenes*, *Brevibacterium saccharolyticum* (for example ATCC No. 14,066), and others.

When applied to industrial production, the method of the invention has several significant advantages over conventional processes. It permits a substantial portion of the carbon source, normally sugar, to be added to the culture as a concentrated solution, thus yielding a relatively concentrated glutamic acid solution. Maximum production of glutamic acid is achieved more rapidly. The percentage yield of glutamic acid based on the total amount of sugar fed to the culture is increased although a lower yield would normally be expected from the use of a culture medium having a relatively high concentration of sugar.

The following Examples V to VIII are typical of the application of our discoveries to industrial processes, but the invention is not limited to these examples, and others skilled in the art will readily apply these teachings of modified and altered processing conditions without the exercise of invention.

EXAMPLE V

A starch hydrolyzate is sterilized by heating to 115° C. for 15 minutes. A fermentation vat having a capacity of 15,000 liters (about 4,000 gallons) is filled with the sterilized hydrolyzate, and minor amounts of addition agents are admixed to bring the composition of the culture medium to the following values:

Sugar (glucose equivalent) ___ 15 grams per 100 ml.
$KH_2PO_4$ ___ 0.1 gram per 100 ml.
$MgSO_4 \cdot 7H_2O$ ___ 0.04 gram per 100 ml.
Fe (II) ions ___ 2 p.p.m.
Mn (II) ions ___ 2 p.p.m.
Biotin ___ 5 micrograms per liter.
Corn steep liquor ___ 0.5 gram per 100 ml.
Vitamin $B_1$ ___ 50 micrograms per liter.

The hydrogen ion concentration of the culture medium was adjusted to pH 7.8 by the introduction of gaseous ammonia, and the medium was inoculated with *Brevibacterium lactofermentum*, strain No. 2256. The medium was agitated and aerated while its temperature was maintained at 31° C., and its pH was kept on the alkaline side.

After 16 hours, the thermostatic temperature controls were set for 36° C., and when that temperature was reached one hour later, 1,100 liters of a 46.6 percent sugar (sugar means starch hydrolyte) solution were mixed with the culture medium which by that time had lost 7.5 percent of its initial sugar content. Incubation was continued at 36° C. for a total elapsed time of 44 hours from the inoculation. The total sugar addition to the medium was 19.5 grams per 100 ml.

The fermentation mixture contained 8.49 grams glutamic acid per 100 ml., and the yield of glutamic acid in terms of total sugar input was 43.5 percent. The liquid portion of the culture was separated from the solids which contained most of the microorganisms, was further clarified by centrifuging, acidified to pH 3.2, and permitted to crystallize. The L-glutamic acid crystals recovered weighed 507 kilograms.

EXAMPLE VI

A culture medium was prepared in the manner described in Example V and was inoculated with *Brevibacterium saccharolyticum*, strain No. 7636, ATCC No. 14,066. After the initial sugar content had decreased by 8 percent, 600 liters of a 44.17 percent cane sugar solution were mixed with the culture medium, and the mixture was brought to a temperature of 36°. After 22 hours from the start of fermentation, the sugar content of the medium had dropped by an additional 3 percent of the initial sugar content, and 600 liters more of the same concentrated sugar solution were added. The total amount of sugar fed to the culture thus was 19.71 grams per 100 ml.

The amount of L-glutamic acid in the fermented medium was 8.27 grams per 100 milliliters, the yield based on the total amount of sugar was 42.0 percent. The amount of glutamic acid recovered by crystallization was 572 kilograms.

EXAMPLE VII

A culture medium was prepared in the manner described in Example V, and was inoculated with *Brevibacterium flavum*, strain No. 3423, ATCC No. 13,826. The original sugar content dropped by 6.5 percent in 16 hours, and 1,000 liters of a 49 percent solution of glucose were mixed with the culture medium to make the total amount of sugar fed to the culture 19.27 grams per 100 milliliters. The temperature of the medium was raised to 38° C. within one hour. The fermentation was completed after 48 hours.

The L-glutamic acid produced amounted to 8.71 grams per 100 milliliters, and the yield on the basis of the sugar used was 45.2 percent. Crystallized L-glutamic acid was recovered from the fermentation mixture as described in Example V and weighed 574 kilograms.

The following example is further illustrative of the results obtained by the method of the invention in the laboratory, and readily duplicated in large-scale production.

EXAMPLE VIII 20 milliliters of a culture medium were prepared and sterilized in a 500 ml. glass flask from the starch hydrolyzate mentioned in Example V. The medium had the following composition:

Sugar (glucose equivalent) -- 10 grams per 100 ml.
$KH_2PO_4$ -------------------- 0.1 gram per 100 ml.
$MgSO_4.7H_2O$ -------------- 0.04 gram per 100 ml.
Urea ------------------------- 0.06 gram per 100 ml.
Biotin ----------------------- 6 micrograms per 100 ml.
Soybean protein hydrolyzate -- 0.5 ml. per 100 ml.
Fe and Mn ions, each -------- 2 parts per million.

The medium was inoculated with *Brevibacterium lactofermentum*, strain No. 2256, and cultivated as described in Example V. It was kept alkaline by addition of 0.5 ml. of a 45% urea solution. After 20 hours, 5.5 milliliters of molasses, containing 45.0 percent sugar were mixed with the culture medium, and the temperature was raised to 34° C. Fermentation was completed after 42 hours.

The fermentation mixture contained 7.3 grams L-glutamic acid per 100 milliliters. The glutamic acid yield based on the total amount of sugar used was 40.1 percent.

While the invention has been described with particular reference to specific embodiments, it is to be understood that it is not limited thereto, but is to be construed broadly and restricted solely by the scope of the appended claims.

What is claimed is:
1. A method of preparing L-glutamic acid by fermentation which comprises:
   (a) culturing a glutamic acid producing microorganism in a medium containing a nitrogen source and a carbohydrate selected from the group consisting of glucose, fructose, maltose, sucrose, and starch hydrolyzate, said carbohydrate being present in said medium, in an initial concentration of approximately 10 to 15 grams per 100 milliliters, and said microorganism being cultured in said medium at a temperature betwen 27° and 32° C. until 5 to 8 percent of said carbohydrate are consumed;
   (b) adding to said medium an additional amount of a carbohydrate selected from said group to make the total amount of carbohydrate originally present and added approximately 20 grams per 100 milliliters of said medium, but not more than 23 grams per 100 milliliters;
   (c) and continuing culturing said microorganism at a temperature of 34° C. to 38° C. to produce glutamic acid in said medium.

2. A method as set forth in claim 1, wherein said added carbohydrate is molasses.

3. A method as set forth in claim 1, wherein said microorganism is a strain of *Brevibacterium lactofermentum* selected from the group of strains respectively identified by American Type Culture Collection Numbers 13,869, 13,655 and 13,689.

4. A method as set forth in claim 1, wherein said microorganism is selected from the group consisting of *Bacillus megaterium*, *Bacillus subtilis*, *Bacillus circularis*, *Bacillus cereus*, *Escherichia coli*, *Micrococcus varians*, *Brevibacterium kawasakii*, *Brevibacterium divaricatum*, *Brevibacterium ammoniagenes*, and *Brevibacterium saccharolyticum*.

5. A method as set forth in claim 1, wherein said microorganism is *Brevibacterium saccharolyticum*, strain ATCC No. 14,066.

6. A method as set forth in claim 1, wherein said microorganism is *Brevibacterium flavum*, strain ATCC No. 13,826.

7. A method as set forth in claim 1, wherein said microorganism is a glutamic acid producing strain of *Brevibacterium*.

8. A method as set forth in claim 1, wherein said additional amount of carbohydrate is added as an aqueous solution containing 44 to 49 percent of said carbohydrate.

References Cited in the file of this patent

UNITED STATES PATENTS 3,003,925    Kinoshita et al. ---------- Oct. 10, 1961
3,066,078    Miescher ---------------- Nov. 27, 1962

OTHER REFERENCES

Otsuka et al.: Chemical Abstracts, 51 7643h to 7644e (1957).